US006315806B1

(12) United States Patent
Torobin et al.

(10) Patent No.: US 6,315,806 B1
(45) Date of Patent: Nov. 13, 2001

(54) METHOD AND APPARATUS FOR PRODUCING HIGH EFFICIENCY FIBROUS MEDIA INCORPORATING DISCONTINUOUS SUB-MICRON DIAMETER FIBERS, AND WEB MEDIA FORMED THEREBY

(76) Inventors: Leonard Torobin, 12555 The Vista, Los Angeles, CA (US) 90049; Richard C. Findlow, 205 Artillery Rd., Southern Pines, NC (US) 28387

(*) Notice: Subject to any disclaimer, the term of this patent is extended or adjusted under 35 U.S.C. 154(b) by 0 days.

(21) Appl. No.: 09/585,381

(22) Filed: Jun. 1, 2000

Related U.S. Application Data

(63) Continuation of application No. 08/935,743, filed on Sep. 23, 1997, now Pat. No. 6,183,670.

(51) Int. Cl.[7] .................................................... B29B 9/10
(52) U.S. Cl. ........................... 55/522; 55/527; 55/DIG. 5; 264/6; 264/12; 264/112; 264/518
(58) Field of Search ..................... 55/486, 487, 522, 55/527, DIG. 5; 264/6, 12, 518, 112, 115, 167; 156/167; 422/28, 37

(56) References Cited

U.S. PATENT DOCUMENTS

| 2,374,540 | 4/1945 | Hall . |
|---|---|---|
| 2,411,659 | 11/1946 | Manning . |
| 2,411,660 | 11/1946 | Manning . |
| 2,437,263 | 3/1948 | Manning . |
| 2,464,301 | 3/1949 | Francis, Jr. . |
| 2,508,462 | 5/1950 | Marshall . |
| 2,571,457 | 10/1951 | Ladisch . |
| 3,017,664 | 1/1962 | Ladisch . |
| 3,379,811 | 4/1968 | Hartmann et al. . |
| 3,502,763 | 3/1970 | Hartmann . |
| 3,595,245 | 7/1971 | Buntin . |
| 3,615,995 | 10/1971 | Buntin . |
| 3,710,948 | 1/1973 | Sexton et al. . |
| 3,755,527 | 8/1973 | Keller et al. . |

(List continued on next page.)

Primary Examiner—David A. Simmons
Assistant Examiner—Minh-Chau T. Pham
(74) Attorney, Agent, or Firm—Foley & Lardner

(57) ABSTRACT

A composite filtration medium web of fibers containing a controlled dispersion of a mixture of sub-micron and greater than sub-micron diameter polymeric fibers is described. The filtration medium is made by a two dimensional array of cells, each of which produces a single high velocity two-phase solids-gas jet of discontinuous fibers entrained in air. The cells are arranged so that the individual jets are induced to collide in flight with neighboring jets in their region of fiber formation, to cause the individual nascent fibers of adjacent jets to deform and become entangled with and partially wrap around each other at high velocity and in a localized fine scale manner before they have had an opportunity to cool to a relatively rigid state. The cells are individually adjusted to control the mean diameters, lengths and trajectories of the fibers they produce. Certain cells are adjusted to generate a significant percentage of fibers having diameters less than one micron diameter, and which are relatively shorter in length and certain other cells are adjusted to generate a significant percentage of structure-forming reinforcing fibers having diameters greater than one micron diameter which are relatively longer in length. By employing appropriate close positioning and orientation of the cells in the array, the sub-micron fibers are caused to promptly entangle with and partially wrap around the larger reinforcing fibers. The larger fibers thereby trap and immobilize the sub-micron diameter fibers in the region of formation, to minimize the tendency of sub-micron diameter fibers to clump, agglomerate, or rope together in flight. Also, the larger fibers in flight are made to form a protective curtain to prevent the sub-micron fibers from being carried off by stray air currents.

16 Claims, 6 Drawing Sheets

FIG. 1

U.S. PATENT DOCUMENTS

| | | |
|---|---|---|
| 3,806,289 | 4/1974 | Schwarz . |
| 3,849,241 | 11/1974 | Butin et al. . |
| 3,972,759 | 8/1976 | Buntin . |
| 3,978,185 | 8/1976 | Buntin et al. . |
| 3,981,650 | 9/1976 | Page . |
| 4,011,067 | 3/1977 | Carey, Jr. . |
| 4,025,593 | 5/1977 | Raganato et al. . |
| 4,041,203 | 8/1977 | Brock et al. . |
| 4,047,861 | 9/1977 | Balaz . |
| 4,064,605 | 12/1977 | Akiyama et al. . |
| 4,078,121 | 3/1978 | Gratzmuller . |
| 4,078,124 | 3/1978 | Prentice . |
| 4,081,226 | 3/1978 | Pleska et al. . |
| 4,100,324 | 7/1978 | Anderson et al. . |
| 4,189,455 | 2/1980 | Raganato et al. . |
| 4,196,245 | 4/1980 | Kitson et al. . |
| 4,211,737 | 7/1980 | Di Drusco et al. . |
| 4,268,235 | 5/1981 | Bean et al. . |
| 4,363,646 | 12/1982 | Torobin . |
| 4,380,570 | 4/1983 | Schwarz . |
| 4,415,512 | 11/1983 | Torobin . |
| 4,536,361 * | 8/1985 | Torobin ............................ 264/167 |
| 4,548,632 | 10/1985 | Tanaka et al. . |
| 4,714,647 | 12/1987 | Shipp, Jr. et al. . |
| 4,983,193 | 1/1991 | Tani et al. . |
| 5,032,326 | 7/1991 | Shin . |
| 5,039,431 * | 8/1991 | Johnson et al. . |
| 5,080,702 | 1/1992 | Bosses . |
| 5,160,746 | 11/1992 | Dodge, II et al. . |
| 5,207,970 | 5/1993 | Joseph et al. . |
| 5,219,633 | 6/1993 | Sabee . |
| 5,260,003 | 11/1993 | Nyssen et al. . |
| 5,290,626 | 3/1994 | Nishio et al. . |
| 5,401,446 | 3/1995 | Tsai et al. . |
| 5,445,777 | 8/1995 | Noel et al. . |
| 5,476,616 * | 12/1995 | Schwarz . |
| 5,480,466 | 1/1996 | Jackson et al. . |
| 5,589,258 | 12/1996 | Maddern et al. . |
| 5,593,768 | 1/1997 | Gessner . |
| 5,792,227 * | 8/1998 | Kahlbaugh et al. ................ 55/486 |
| 5,800,587 * | 9/1998 | Kahlbaugh et al. ................ 55/486 |
| 5,908,856 * | 6/1999 | Oldenhove ........................ 422/28 |
| 5,922,693 * | 7/1999 | Oldenhove ........................ 422/28 |
| 5,976,427 * | 11/1999 | Choi . |
| 6,019,809 * | 2/2000 | Kahlbaugh et al. ................ 55/486 |
| 6,183,670 * | 2/2001 | Torobin et al. .................... 264/6 |

\* cited by examiner

METHOD AND APPARATUS FOR PRODUCING HIGH EFFICIENCY FIBROUS MEDIA INCORPORATING DISCONTINUOUS SUB-MICRON DIAMETER FIBERS, AND WEB MEDIA FORMED THEREBY

This application is a Continuation of application Ser. No. 08/935,743, filed Sep. 23, 1997, now U.S. Pat. No. 6,183,670, which application is incorporated herein by reference.

FIELD OF INVENTION

The present invention relates generally to methods and apparatuses for producing fibrous media, and fibrous web material formed thereby, and in preferred embodiments, to methods and apparatuses for producing composite fibrous media composed of discontinuous fine fibers and controlled dispersions of discontinuous ultra-fine or sub-micron electrostatically charged or uncharged fibers. Further preferred embodiments relate to filtration media and absorbent media comprising such composite fibrous media.

BACKGROUND OF THE INVENTION

The increased recognition of the deleterious health effects of chemical and biological pollutants, which often are in the form of particles of less than one micron in diameter, has created an urgent requirement for filtration media capable of removing such particles in an efficient and economical manner. There is a wide range of filter media available for removal of particles from air used for breathing or other processes requiring specific air purity standards. However, most of these media lose efficiency rapidly or increase in price and investment and operating costs, as particle filtrate size decreases.

A major portion of such increased cost is due to costs associated with the increased resistance of the filter to air flow as the efficiency of particle removal is increased. This creates a higher pressure drop for movement of air through the filter thereby imposing a greater work requirement upon the filter fan. This, in turn, can require the use of larger and more costly fans which consume greater amounts of energy which can make the entire process economically prohibitive. Also, filters capable of removing sub-micron diameter particles generally tend to rapidly plug up, necessitating frequent and costly filter replacement.

The most common filter media for air filtration consists of fibrous webs of fine fibers laid flat so that most are perpendicular to the direction of flow of the air being filtered. In the absence of electrostatic charging effects, equations describing the laws of fluid dynamics for particulate solids in an air stream have been found to provide good predictions of filter performance. Such physical laws and associated equations have been described by L. B. Torobin in "Momentum Transfer in Solids-Gas Flow", Ph.D. Thesis, McGill University, 1960 ("Torobin Thesis"), incorporated herein by reference.

The effect of fiber size on air or gas filter collection efficiency has been calculated by W. C. Hinds, in "Aerosol Technology", Wiley, 1982, p 184, using the appropriate solids-gas fluid dynamics equations with parameters set for conditions typical in industrial, commercial, and domestic air filters. The calculations reveal that, if sub-micron diameter fibers could be incorporated into filtration media in a uniform manner, they would be very effective in removal of sub-micron diameter particles from air streams. For a typical pollutant particle of 0.3 micron diameters entrained in air flowing through a filter made up of 10 micron diameter fibers, approximately 30 percent of the pollution particles were not removed by the filter. When the fiber diameter was reduced to 2 micron diameters, which corresponds to the lower limit of most industrial filters available today, the amount of unfiltered particulate matter decreased to approximately 17 per cent. Hinds projects that, if the media could employ fibers with a diameter 0.5 micron diameter, the filter would trap all but 3 percent of the incoming pollutant particles, while requiring only a relatively low pressure drop to sustain the flow of the gas being purified through the filter.

A number of significant problems, however, have inhibited the use appreciable quantities of sub-micron fibers in filter media. For example, one problem has been the difficulty of achieving uniform deposition of sub-micron diameter polymeric fibers onto a collecting surface. This is due, in part, to their tendency to to fly about in the fiber formation process. Because of their small size and low density, the sub-micron diameter polymeric fibers are extremely light and are therefore readily entrained in the stray large turbulence scale air currents, which are induced by essentially all fiber formation and collection processes.

This is in keeping with the theoretical predictions which show that currents with only one tenth to one hundredth the velocities needed to entrain the fibers above one micron in size are enough to carry off the sub-micron fibers. (Torobin Thesis at 228.) The dimensions of these currents or eddies and their velocities increase as the production process size is increased from the laboratory scale to commercial scale, and as the production processes are adjusted to make finer fibers. Accordingly, by conventional filter production methods, many of the sub-micron diameter fibers are not incorporated into the fiber web. Further, the stray fibers can damage or impair the filter production equipment.

Another problem inhibiting the use of appreciable quantities of sub-micron diameter polymeric fibers in filter media results from the greater tendency of polymeric sub-micron diameter fibers to attach to each other in flight during formation, forming undesired loose clumps, "ropes" or other agglomerates. This is a consequence, in part, of the unusually high ratio of fiber surface area to fiber volume characteristic of sub-micron diameter fibers. When this is combined with the relatively low density of polymers, the fibers tend to adhere to each other on contact.

The agglomeration problem is exacerbated by the presence of twisting and recirculating vortices in the ambient air which tend to twist the agglomerates into ropelike structures. The agglomerates eventually settle onto the formed fiber web where they constitute a source of significant non-uniformity. Another problem inhibiting the use of appreciable quantities of sub-micron diameter polymeric fibers in filter media results from the tendency of sub-micron diameter fibers to exhibit poor overall web mechanical properties and lack of self-support. This follows from the low tensile strength and relatively short length of the sub-micron diameter fibers. Sub-micron diameter fibers tend to only poorly attach to each other and are thereby susceptible to being lifted off and blown away by air currents associated with fiber production. Also, when such fiber webs are used as air filters, significant quantities of the sub-micron fibers are carried away intermittently by the air being purified. This results in unacceptable contamination of the air stream flowing through the filter.

Yet another problem retarding the use of sub-micron diameter polymeric fiber filtration media is the difficulty of uniformly distributing the ultra-fine fibers in the fiber web. If the sub-micron fibers are not uniformly distributed, much of the air being treated by the filter will not be subjected to the high efficiencies imparted by the sub-micron diameter fibers. Moreover, because the higher surface area associated with each region of high concentrations of the sub-micron diameter fibers imparts to it a relatively high resistance to air flow compared to regions of low concentrations, the ultra-fine fibers in these regions tend to be bypassed by the air being filtered, thereby reducing their effectiveness.

In addition to non-uniform distribution over the length and width of the fiber web, there is also a tendency for the sub-micron diameter fibers to collect at a certain depth of the fiber web. This results in premature plugging of the filter, since most of the solids separated by the filter collect in a thin plane.

It was found that the aforementioned difficulties encountered with sub-micron diameter polymeric fibers could be avoided to some degree when the fibers were made from higher tensile strength and higher density materials such as glass. Consequently, many of the air filters used today include sub-micron glass fibers. Sub-micron diameter glass fibers have been produced and incorporated in filtration media, as described, for example, in U.S. Pat. No. 4,548,632.

However, experiences with asbestos fibers has led to concerns about the possibility of adverse health effects resulting from the inhalation of such fine glass fibers. Also, pollutant-laden, used glass fiber filters cannot be disposed of by incineration. They constitute a hazardous waste which must be handled, at considerable expense and risk, in land fills. In response to these concerns, filtration media made from polymeric materials composed of fibers larger in diameter than their glass counterparts are displacing glass media, notwithstanding the poorer performance characteristics of the larger diameter polymer fibers. Consequently, a need exists in the air filtration industry for a filtration media exhibiting the benefits of sub-micron diameter fibers, without the aforementioned problems associated with the production of sub-micron polymer fibers or the health concerns associated with glass fibers.

The production of fine fibers from polymeric melts has been the subject of many efforts during the last half century. Research in the early 1950's by Van A. Wente at the Naval Research Laboratory led to a major fiber making procedure referred to as "melt-blowing." It is summarized in NRL report 5265, 1959. Conventional melt-blowing processes employ the fiber-forming polymers in molten form i.e. as a "melt" extruded through extremely small diameter orifices in a heated die. The resulting liquid jets of molten polymer are introduced into high-velocity blasts of heated air external to the liquid jets. The high velocity gas blasts stretch and attenuate the molten polymer jets into fine discontinuous "blown" fibers which are then collected on a moving surface. Although the early work resulted in finer fibers than had been made previously, they were still an order of magnitude above the sub-micron diameter diameters needed for efficient air filtration of sub-micron diameter particles.

Others improved the melt-blowing process making it possible to manufacture fibers generally in the 2 to 10 micron diameter range with a small quantity of sub-micron diameter fibers. Examples of patents describing fibers produced by melt-blowing processes include Hall (U.S. Pat. No. 2,374,540), Manning (U.S. Pat. Nos. 2,411,659; 2,411,660; and 2,437,263), Marshall (U.S. Pat. No. 2,508,462), Francis (U.S. Pat. No. 2,464,301); Ladisch (U.S. Pat. Nos. 2,571,457 and 3,017,664); Hartmann et. al. (U.S. Pat. No. 3,379,811), Hartmann (U.S. Pat. No. 3,502,763), and Buntin et. al. (U.S. Pat. Nos. 3,595,245, 3,615,995, 3,849,241, and 3,978,185); and Buntin, (U.S. Pat. Nos. 3,755,527, and 3,972,759).

The most common method of providing the external heated blast air for melt-blowing fiber production is accomplished through the use of two dimensional slot jets of various geometries and at various locations. Alternatively, the external heated blast air is provided via one dimensional jets surrounding each of the liquid polymer jets, as described in, for example Balaz (U.S. Pat. No. 4,047,861), Tunica, et. al. (U.S. Pat. No. 4,548,632), and Schwarz (U.S. Pat. Nos. 4,380,570, and 5,476,616).

In U.S. Pat. No. 3,972,759, Buntin describes an improved melt-blowing process for making fibrous webs which contain an average fiber diameter of 2 micron diameters, with an undisclosed percentage of fibers as low as 0.5 micron diameters. However, Buntin further notes that very low melt viscosity and very high gas velocities are required to make even a small fraction of sub-micron diameter fibers. Buntin reports that the required gas blast caused "extreme" fiber breakage and caused many fibers to be blown away from the laydown zone so that the fibers produced could not be incorporated into a practical fibrous web. Further, the large amount of heated gas required in the process reported by Buntin tended to make melt-blowing uneconomical for sub-micron diameter fiber production. Similarly, Joseph et. al. (U.S. Pat. No. 5,207,970) report increased difficulty in obtaining webs having uniform properties as the blast air rates were increased. Compared with other applications of fibrous webs, those used for filtration must achieve an high level of uniformity in order to maintain filtration efficiency. In addition to uniformity, the melt-blowing processes do not have means to overcome the combined problems of web weakness, fiber agglomeration and tendency for detachment from the web inherently associated with sub-micron fibers.

The problem of poor mechanical strength of filter webs containing substantial quantities of weak fibers has been addressed by a number of methods. Generally, these methods have been successful only when applied to polymeric fibers greater than one micron in diameter, but they have been considered for sub-micron fibers. The most direct method practiced to support weak fiber webs has been to support such webs by means of one or more layers of sufficiently strong fabric made from a diversity of materials. For example, Sexton et. al.. (U.S. Pat. No. 3,710,948), describes the use of an inner and outer layer of self-supporting and porous "scrim" fabric to support and contain an inner layer of relatively weak non-self sustaining fibers, which constitute the filtration medium.

Scrim reinforcing fabrics are often made from monofilaments of resin bonded together by heated calenders. Carey (U.S. Pat. No. 4,011,067) reports collecting a thin layer of about 0.2 ounce per square yard of sub-micron fibers on a scrim material and then covering it with a second scrim layer. This is much thinner than filters for general use, which require filter fiber weights of about 0.5 to 4 ounce per square yard.

Brock et. al. (U.S. Pat. No. 4,041,203) describes the use of a scrim to support fibers less than 10 microns, and they avoid calendering by the use of intermittent bonds. Other examples of the use of layers of handleable self-supporting porous materials to support weak fibers or protect them from abrasion are described by Prentice (U.S. Pat. No. 4,078,121), Kitson, et. al. (U.S. Pat. No. 4,196,245), and Bosses (U.S. Pat. No. 5,080,702). In combination with the use of supporting layers, methods have been reported in which the resulting system is impregnated with a bonding agent an example being Maddern, et. al. (U.S. Pat. No. 5,589,258).

The use of self-supporting porous layers of materials to overcome the inherent weakness of sub-micron fibers does not alleviated the problems of clumping, roping, segregation, and entrainment in stray air currents which occurs with sub-micron fibers prior to deposition on any surface. Even when the combination has macroscopic good strength, the weak inner core of sub-micron fibers has been found to develop cracks and regions of separation in the vibration that occurs in certain filter uses, due to local weakness of the fiber-to-fiber bonds. This allowed the air to be filtered to bypass or "short" through the filter, with a corresponding degradation of performance to an unacceptable level. In addition, calendering with a pressure sufficient to cause fiber-to-fiber fusion and the use of bonding agents can tend to result in excessive degradation of filtration performance when applied to sub-micron fibers. Because of their weakness, calendering causes them to compress into a plane with high resistance and low dust holding ability. Where a binder is used, the high surface area of the sub-micron fibers causes them to soak up too much binder and become partially clogged.

A second general method for addressing the poor strength of filter webs containing significant quantities of weak fibers has been to sequentially deposit and thereby sandwich layers of the weak fibers between layers of fibers whose diameters and lengths are sufficient to impart adequate strength to the composite matrix. Each layer is produced in a separate one-dimensional linear melt-blowing die with its associated gas blast generators. To make the layered media, the dies and their associated gas blast generators are generally positioned to be in a plane parallel to the plane of a moving foraminous belt and are set perpendicular to the direction of movement of the belt. The dies and their associated gas blast generators are typically placed in series with each other in a downstream direction. Some mixing can occur between the relatively weak fibers and the strong fibers. Examples of such arrangements are disclosed by R. R. Buntin, TAPPI, 56 (1973) 74; M. Ahmed (Polypropylene Fibers Science and Technology, 1982, Elsevier Co.,pp 437–440), Prentice (U.S. Pat. No. 4,078,124), Shipp et. al. (U.S. Pat. No. 4,714,647), Tani et. al. (U.S. Pat. No. 4,983,193) and Schwarz (U.S. Pat. No. 5,4766,616). Ahmed points out, however, that such arrangements lead to layers which are poorly attached to each other, unless the fiber bed thickness is considerably greater than the thickness required by filtration media. Poor attachment of the structure forming layers to the layer of weak fibers would mean that the weak layer would be unprotected with respect to fibrous web tensile forces.

The poor attachment of the layers as one reduces fiber diameter results, in part, from the inability to space the conventional melt-blowing dies close to one another in the down stream direction. In the standard melt-blowing system, a large amount of air is used in the "blast" jets. Accordingly, there must be sufficient distance between the dies so that the blast air of one does not disturb the layers already deposited or blow away the fine fibers contained therein, Also, there must be sufficient space to provide duct means to remove this air flow and the ducting can trap increasing amounts of fibers which may fall off as undesirable large agglomerates onto the fibrous web.

The results reported by Nissen et. al. (U.S. Pat. No. 5,260,003) for conventional and improved melt-blowing technology show that the blast air energy requirements increased exponentially from an average of 4 kilowatts per kilogram of fiber produced for fibers of about 3.2 micron diameter, to approximately 38 kilowatts per kilogram of fiber produced for fibers of 1.3 micron diameter. For the same fiber diameter reduction, it was necessary to reduce the overall fiber production rate for each die orifice from 0.12 pound per hour to 0.01 pound per hour. This suggests that adaption of melt-blowing geometries for the commercial production of sub-micron diameter fibers would be prohibitively expensive both in operating and equipment costs.

A third general method of forming webs which incorporate weak fibers is to cause their intermingling with reinforcing fibers. Page (U.S. Pat. No. 3,981,650) describes a modified melt-blowing die which allows the feeding of two different polymers to alternate orifices. This results in the production of intermixed compositions. It would be impractical to attempt to adapt this method to the production of intermixed fibers of sub-micron diameter fibers with fibers large enough in diameter to be reinforcing, since it would require the close spacing of blast jets with one or two orders of magnitude difference in velocity.

Anderson, et. al . (U.S. Pat. No. 4,100,324) suggests turbulently mixing melt-blown fibers with relatively large wood pulp fibers in air to form a matrix. In the process disclosed, the polymer fibers are required to be of sufficient strength to hold captive and interconnect the cellulose fibers and sub-micron polymer fibers would be too weak and too short for this purpose. Also, the high blast velocities required to form sub-micron fibers tend to blow the bulk of the relatively large cellulose fibers away.

General methods have been proposed for mixing weak and strong fibers after their formation and bonding the two together with binders. Binders in the form of particulates tend to plug filtration surfaces, however. This problem can be addressed, to some extent, by the incorporation of reinforcing fibers which have a lower melting point than the weak fiber constituents of a mixture of fibers. Bonding is achieved by heating the reinforcing fibers above their melting point and applying pressure to the web. An example of this method is given by Jackson, et. al. (U.S. Pat. No. 5,480,466). It would be difficult to adapt this procedure to sub-micron fibers since they would be in a clumped state upon collection prior to mixing, and the required uniformity of dispersion for an efficient filtration web would be difficult to establish.

Bean, et. al. (U.S. Pat. No. 4,268,235) describes a general process for mixing fibers of various sizes to form a web and then insuring uniformity of distribution by the use of parallel banks of oscillating brushes. While this method may be applicable to relatively large fibers, sub-micron fibers clump together when placed in contact with each other and it would be impractical to attempt to separate them after their collection and attempt to distribute them in a web containing larger fibers. Also the gross inter-mixing of sub-micron fibers with the larger fibers can cause discontinuities in the bonds between the larger fibers so that the resulting web would be too weak for use as a practical filter medium.

An alternative approach has been disclosed to produce sub-micron diameter fibers in which the polymer used to produce the fibers is first dissolved in a solvent and the solution is fiberized by conventional means or allowing the solvent to boil due to a sudden release of pressure. Although the resulting solution fibers are above one micron in diameter, the fiber diameters shrink as the solvent is evaporated or boiled. The resulting fibers may be sub-micron in diameter and they may be immobilized by bonding to each other due to the solvent action. Examples are described by Pleska, et. al. (U.S. Pat. No. 4,081,226), Raganato et. al. (U.S. Pat. No. 4,025,593, and, 4,189,455), Di Drusco, et. al., (U.S. Pat. No. 4,211,737), Shin (U.S. Pat. No. 5,032,326), and Nishioi, et. al. (U.S. Pat. No. 5,290,626).

Unfortunately solvent based processes are prohibitively expensive for general use. In addition, the solvents can present the potential for pollution if they escape the enclosures of the process.

Electrostatic charging of fibers used in filtration has been used in attempts to overcome the relatively low efficiencies of the existing polymeric media made from relatively large diameter fibers. The media thus produced are referred to as "electrets" and their use is reviewed by J. Van Turnhout in "Electret Filters for High Efficiency Air Cleaning" Journal of Electrostatics, 8 (1980). A recent example of such practice is disclosed by Tsai, et. al. U.S. Pat No. 5,401,446. Unfortunately electrostatic charge may leak away during storage or use of polymeric fiber media made from relatively large diameter fibers. Also, the electrostatic charge in such media tends to concentrate on its outer surfaces. The solids stopped by the charged filter tend to collect in a surface plane. Consequently, the interior volume of the filter may not be used efficiently, resulting in a relatively low dust holding capability. M. D. Bosses, however, in "Evolution of Improved Vacuum Cleaner Bags" Second Annual TANDEC Conference, 1992, reports that sub-micron diameter fibers "dramatically enhance " the capacity of electrostatically charged melt-blown media, adding further incentives for the development of media which contain uniformly distributed and properly anchored sub-micron diameter fibers.

In recent years, alternative processes have become available which have the ability to produce discontinuous sub-micron diameter fibers from molten materials while avoiding some of the problems associated with the conventional melt-blown process, particularly the problems associated with the large volumes and velocities of heated blast air and the low production rates of each orifice. Examples of the alternative processes are disclosed by Torobin in U.S. Pat. Nos. 4,363,646; 4,415,512; and 4,536,361. None of these examples disclose practical methods for preparing commercial-sized sheets of composite fibrous webs of polymeric materials which contain significant quantities of uniformly distributed and attached sub-micron diameter fibers. A need in the industry exists for a method of and apparatus for producing such composite fibrous webs which cost-effectively avoid or resolve the aforementioned problems.

SUMMARY OF THE DISCLOSURE

Preferred embodiments of the present invention relate to methods and apparatuses for producing composite fibrous media composed of discontinuous fine fibers and discontinuous ultra-fine electrostatically charged or uncharged fibers. Further preferred embodiments relate to composite fibrous media produced thereby and filtration media, particle wipe media and absorbent media comprising such composite fibrous media.

Preferred embodiments employ a source of fiberizing gas and a source of molten polymer fluid substance or substances which, when combined with a jet stream of fiberizing gas, will produce filaments of the polymer as it cools. Preferred embodiments of an apparatus include a cell mounting plate, in which is mounted a planar array of a plurality of rows of fiber producing cells, each cell capable of adjustably controlling the diameter and angle of spray of a mixture of molten polymer and fiberizing gas, a plurality of conduits supplying the molten polymer fluid and fiberizing gas to the fiber producing cells, a foraminous belt, a plurality of belt driver rolls, a moveable air permeable collection surface such as screen mesh, an air suction box, and a plurality of compaction rolls.

Filtration medium is made, preferably, by a two dimensional array of equally spaced and individually adjustable cells, each of which is supplied with fiberizing gas and molten polymer to produce a single high velocity two-phase solids-gas jet of discontinuous fibers entrained in air. The individual cells in the array are rotatably positioned relative to each other so that the jet spray from a cell is induced to intermingle and combine with the jet sprays of neighboring cells in its proximity. This enhances the collision and consequential intermingling and intertwining of nascent fibers in flight in the region of fiber formation, in a manner which causes the fibers to deform and become entangled with and partially wrap around each other at high velocity and in a localized fine scale manner before they have had an opportunity to cool to a relatively rigid state.

The collided and entangled fibers are subsequently formed into a web by being drawn onto the upper surface of a planar section of a moving continuous foraminous belt by means of an air flow induced by a high air volume suction box placed in contact with the underside of the section of the belt.

Preferably, the cells are individually adjusted to control the mean diameters, lengths and trajectories of the fibers they produce. Certain cells in the two dimensional array may be adjusted to generate a significant percentage of fibers having diameters less than one micron diameter, and which are relatively shorter in length. Certain other cells in the array may be adjusted to generate a significant percentage of structure-forming reinforcing fibers having diameters greater than one micron diameter which are relatively longer in length. By employing appropriately close positioning and orientation of the cells in the array, drag forces created by air eddies induced by the colliding sprays of adjacent cells are used to induce sub-micron diameter fibers to partially entwine around some of the larger diameter fibers. The sub-micron fibers are thereby caused to promptly entangle with and partially wrap around the larger reinforcing fibers. The larger fibers thereby trap and immobilize the sub-micron diameter fibers in a fine scale manner in the region of their formation to minimize the tendency of sub-micron diameter fibers to clump, agglomerate, or rope together in flight. Also, the cells producing the larger fibers are selected to form a protective curtain of larger fibers around each cell producing sub-micron diameter fibers, to prevent the sub-micron diameter fibers from being carried off by stray air currents, or to subsequently to detach from their position in the settled web. The entangled larger fibers also overcome the inherent mechanical weakness and excessive compressibility of sub-micron fiber webs, thereby enabling the practical use of sub-micron fibers in filtration systems, including air filtration systems.

The resultant aggregate of commingled and intertwined fibers are subsequently deposited on a moving air permeable collection surface such as a composite fibrous web. The fiber aggregate is drawn down and compacted onto the air permeable moving collection surface by negative air pressure induced by the suction box. In further preferred embodiments the resultant aggregate is compacted by passing the aggregate through compaction rollers.

It is an object of some preferred embodiments of the present invention to provide a method and apparatus for producing a composite fibrous medium containing sub-micron fibers, which exhibits improved uniformity of composition and tensile strength over that previously available and which does not pose the health concerns associated with filtration media composed of glass fibers.

It is another object of some preferred embodiments of the invention to provide a method and apparatus for producing a composite filtration medium web of fibers containing a controlled dispersion of discontinuous sub-micron diameter polymeric fibers.

It is a further object of some preferred embodiments of the invention to provide a process and apparatus for the production of relatively strong composite fibrous webs of discontinuous fibers made of polymeric materials, which fibrous webs contain significant amounts of sub-micron diameter fibers suitably dispersed for use as high efficiency filtration media to purify air and other fluids.

It is another object of some preferred embodiments of the invention to make high efficiency polymeric composite filtration media incorporating sub-micron diameter fibers which incur relatively low pressure losses associated with the flow of air or other gasses through such media.

It is a further object of some preferred embodiments of the invention to provide a process and apparatus for the production of relatively strong composite fibrous webs of discontinuous fibers, which fibrous webs contain significant amounts of sub-micron diameter fibers suitably dispersed for use as highly absorbent material.

Another objective of some preferred embodiments of the invention is to allow the production of commercial quantities of sub-micron fibers in a manner which avoids their tendency to be blown away prior to their incorporation into a fibrous web which can be employed as at least one of the following media: practical filtration medium, fine particle wipe medium or absorbent medium.

Another objective of some preferred embodiments of the invention is to prepare web of fibers containing sub-micron fibers for use as a filtration medium in which such sub-micron fibers are anchored sufficiently in the web to minimize their subsequent detachment, for example, during the passage of air through the filtration medium.

Another objective of some preferred embodiments of the this invention is to prepare a web of fibers containing sub-micron fibers for use as a filtration medium or particle wipe medium, in which such sub-micron fibers are suitably dispersed so as to produce a filtration medium with superior dust and small particle holding ability.

Yet another objective of some preferred embodiments of the invention is to provide a process which allows the creation of a web of sub-micron diameter fibers which minimizes the clumping together and clustering of the sub-micron diameter fibers so that they can be used efficiently to capture sub-micron diameter particles in a fiber web filter or wipe medium.

Still another objective of some preferred embodiments of this invention is to provide a process which allows the creation of a web of sub-micron diameter fibers in conjunction with larger diameter and longer fibers in a manner which overcomes the low mechanical strength of the web which might otherwise occur due to the presence of the relatively weak sub-micron diameter fibers.

A further object of some preferred embodiments the present invention is to make polymeric composite filtration media incorporating sub-micron diameter fibers with efficiencies high enough to avoid the need for electrostatic charging, thereby avoiding the costs of charging and the potential loss of filtration efficiency which results from the loss of charge of the media while it is in storage or in use.

Another object of some preferred embodiments of this invention to make polymeric composite filtration media incorporating sub-micron diameter fibers which enhance and maintain the effect of electrostatic charging, where such charging can result in removal of sub-micron diameter particulate pollutants from gas streams at very high efficiencies.

It is another object of some preferred embodiments of the invention to make polymeric composite filtration media incorporating sub-micron diameter fibers which avoid the high cost and potential for pollution of solvents.

It is still another objective of this invention to make polymeric composite filtration media incorporating different fiber dimensions and compositions in specific regions of the filter fibrous web and to do so in an economical manner.

BRIEF DESCRIPTION OF THE DRAWINGS

Embodiments of the invention are described herein with reference to the accompanying Figure, wherein like numbers designate like parts.

DETAILED DESCRIPTION OF PREFERRED EMBODIMENTS

The following detailed description is of the best presently contemplated mode of carrying out the invention. This description is not to be taken in a limiting sense, but is made merely for the purpose of illustrating general principles of the invention. The scope of the invention is best defined by the appended claims.

Preferred embodiments of the present invention relate to methods and apparatuses for producing composite fibrous media composed of discontinuous fine fibers and discontinuous ultra-fine electrostatically charged or uncharged fibers. Further preferred embodiments relate to composite fibrous media produced thereby and filtration media, particle wipe media and absorbent media comprising such composite fibrous media.

Embodiments of the instant invention are directed to web media, and methods and apparatuses for the production web media, wherein the web media incorporates substantial amounts of discontinuous polymeric fibers having sub-micron diameters in a manner which would allow the exploitation of the higher particle collection efficiencies and electrostatic charge efficiencies associated with such sub-micron diameter fibers. Further embodiments of the present invention relate to filtration media, particle wipe media and absorbent media comprising such web media. In preferred embodiments, the web media contains a controlled uniform dispersion of such sub-micron diameter fibers, whereby the sub-micron fibers are intimately commingled and entangled with larger diameter structure forming fibers, thereby overcoming the tendency of sub-micron fibers to form inefficient aggregates, or non-useful clumps, or from becoming easily detached from the fibrous web, which could, for example, contaminate the air or other fluid being filtered by the filter medium.

The process and apparatus in accordance with preferred embodiments of the present invention, as compared to prior art layered media process as described above, results in composite fibrous webs in which immobilization of sub-micron diameter fibers is maximized by their entanglement in larger structure forming fibers and fiber separation thereby minimized. The attached drawings and photograph illustrates exemplary forms of the method and apparatus of some preferred embodiments of the present invention for making relatively strong polymeric fiber web media containing sub-micron diameter fibers and an example of a filtration medium formed therewith.

Figure 1:
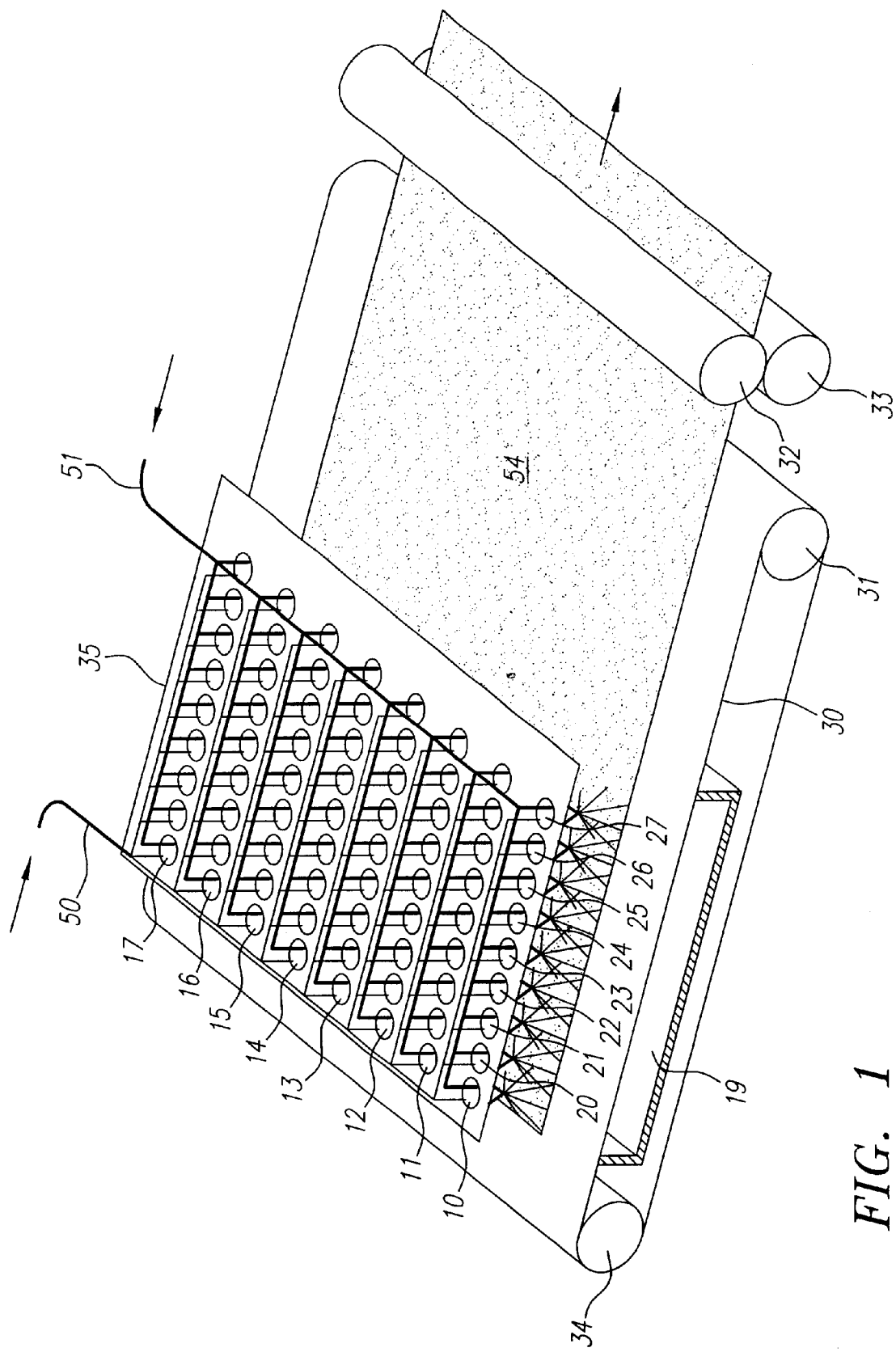
FIG. 1 is a perspective view of an apparatus in accordance with a preferred embodiment of the present invention.

FIG. 1 illustrates a cell array having a row of fiber producing cells comprising cells 10, 11, 12, 13, 14, 15, 16 and 17, which cells are exemplified by, but not limited to, fiber producing cells disclosed by L. B. Torobin in U.S. Pat. Nos. 4,363,646, 4,415,512, and 4,536,311, each of which are incorporated herein by reference. The cell array shown in FIG. 1 includes nine parallel rows of such cells, with the first member of each row, moving from the left to the right, being cells 10, 20, 21, 22, 23, 24, 25, 26 and 27, respectively. The cells are positioned relative to each other and to the other components of the apparatus by a cell mounting plate 35, which is fixed in a horizontal position by support brackets (not shown). The cells are, thus, set in a two dimensional x-y array of cells, in closely spaced parallel rows. For purposes of simplifying the present explanation, the direction from left to right is referred to herein as the x direction, whereas the direction into the page (from front to back) is referred to herein as the y direction.

Each cell in the two dimensional array is supplied with molten polymer fluid through a first conduit 51, and each cell is further supplied with fiberizing gas fluid through a second conduit 50. Each cell produces a single jet spray of fluid containing nascent entrained fibers resulting from the combination of the molten polymer fluid and fiberizing gas through the conduit, in accordance with suitable fiber producing cell methods and devices.

The temperatures, pressures and flow rates of each fluid to each cell are controlled by conventional temperature control means (not shown). These temperatures, pressures and flow rates of the fluids, as adjusted for each cell, determine the amount of fiber and fiber size produced at each cell, in accordance with suitable known fiber producing cell methods. Thus, each of the individually adjustable fiber producing cells produces a jet spray containing discontinuous or continuous fibers having diameters within a selectably controlled range of diameters. As discussed below, in accordance with preferred embodiments of the present invention, some of the cells in the array are adjusted to produce fibers containing a relatively high percentage of sub-micron diameter fibers, while the remainder produce sprays comprising a relatively high percentage of fibers having a diameter of one micron or larger.

Figure 2:
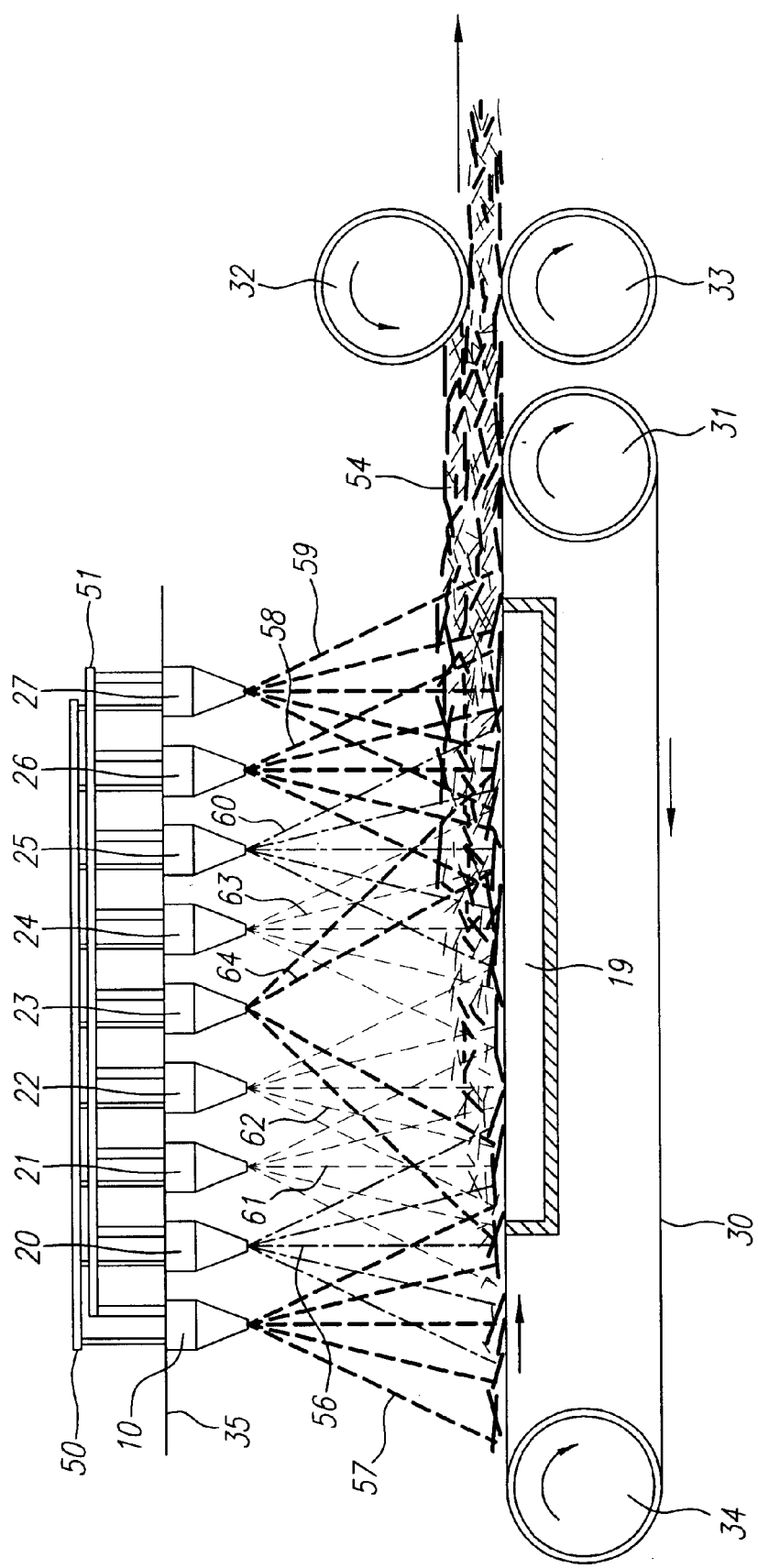
FIG. 2 is a side view of the apparatus shown in FIG. 1, operating in accordance with a preferred embodiment of the invention.

FIG. 2 shows a side view of the two dimensional x-y array of cells of FIG. 1. Referring to FIG. 2, in one preferred embodiment, cells 20, 21, 22 and 24 are set so that they adjustably produce sprays 56, 61, 62 and 63, respectively, all containing mostly fibers having diameters less than one micron diameter. Cells 10, 23, 26 and 27 are set so that they produce sprays 57, 64, 58 and 59, respectively, all containing mostly fibers of diameters of about one to three microns in diameter. Cell 25 is set to produce a spray of fibers with fiber diameters averaging about one micron in diameter.

Because of the angles of enclosure selected for each spray, and the close positioning of each cell relative to its neighboring cells, the fibers produced by each cell generally spread out and separate from each other at formation, but then collide with those produced by other cells in the immediate and near vicinity. These collisions occur in flight and cause an intertwining and fine scale entanglement of a substantial number of sub-micron diameter fibers with the larger diameter structure forming fibers. As an example, the angle of enclosure for the spray 64 issuing from cell 23 is shown as 70 degrees.

The resulting dispersion of sub-micron diameter fibers commingled with larger structure forming fibers is collected with the aid of suction box 19 on a foraminous belt 30, to form a composite fibrous web of fibers 54 which may be compacted or otherwise bonded by compression rolls 32 and 33. Belt 30 may be rotated by means of a driver roll which may be either roll 31 or roll 34, for example. Each particular cell, for example, 10, is preferably aligned so that the spray it produces is symmetrical with respect to a vertical line drawn through the particular cell body.

Figure 3:
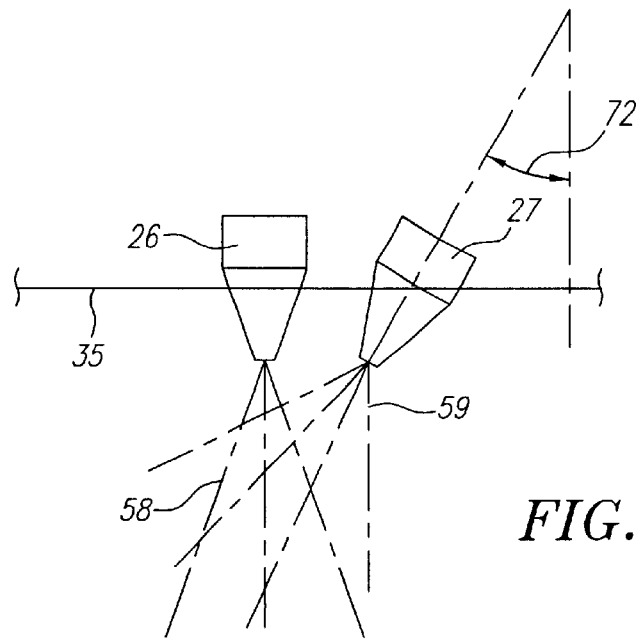
FIG. 3 is a side schematic view of a pair of fiber producing cells rotated (or angled) to enhance the collision of fibers produced by one cell with fibers produced by an adjacent cell, in accordance with a preferred embodiment of the invention.

An alternative embodiment is illustrated in FIG. 3, in which the alignment of any cell, here shown as 27 is rotated (or angled) from the vertical so that the axis of symmetry of the predominant spray pattern is at some angle 72 from the vertical to promote the collision in flight of fibers produced by this cell with fibers in flight produced by an adjacent cell, here shown as cell 26, to increase their entanglement, and to cause fibers of a particular size to be dispersed in a particular region of the composite fibrous web.

The composite web fiber size distribution, both through the fibrous web thickness and across the fibrous web width, can be further altered by changing the operating conditions of particular cells to arrive at different production rates of fibers of particular sizes. In this manner, the composite web of fibers can be adjusted to achieve a balance between the need for high filtration efficiency, low resistance to air flow, and strength, as required by different filtration applications.

Further, according to preferred embodiments of the present invention, certain cells in the two dimensional array are adjusted to generate a significant percentage of (or mostly) fibers having diameters less than one micron diameter, and which are relatively shorter in length. Certain other cells in the array are adjusted to generate a significant percentage of (or mostly) structure-forming reinforcing fibers having diameters greater than one micron diameter which are relatively longer in length. By employing appropriate close positioning and orientation of the cells in the array, the sub-micron fibers are caused to promptly entangle with and partially wrap around the larger reinforcing fibers, as discussed above. The larger fibers thereby trap and immobilize the sub-micron diameter fibers in a fine scale manner in the region of their formation to minimize the tendency of sub-micron diameter fibers to clump, agglomerate, or rope together in flight.

In preferred embodiments, the cells adjusted to generate mostly fibers greater than one micron in diameter are selected, arranged or adjusted to generate sprays that effectively surround or curtain sprays generated by other cells adjusted to produce a significant percentage of (or mostly) sub-micron diameter fibers, as shown in FIG. 2. For example, in one preferred embodiment, the cells in the first and last rows of the two dimensional array of cells are controlled to produce a high percentage of fibers which have diameters greater than one micron, and the remainder of the cells are controlled to produce discontinuous sub-micron diameter fibers. In further preferred embodiments, the cells producing a significant percentage of sub-micron diameter fibers are alternateley arranged with the cells producing mostly larger diameter fibers, such that the two types of cells alternate along each row in either or both of the x and y directions in the array cells. In yet further preferred embodiments, each cell producing a significant percentage of sub-micron diameter fibers is surrounded by cells producing mostly larger diameter fibers. Thus, the proximity and/or jetting angle of cells controlled to produce mostly fibers greater than one micron, relative to cells producing a high percentage of sub-micron fibers in the array, are selected to enhance (or, more preferably, necessitate) intermingling of the larger diameter fibers with the sub-micron diameter fibers, before the submicron diameter fibers can be carried out of the web-producing area by jetting or stray air currents.

In this manner, the cells may be controlled such that the larger fibers tend to form a protective curtain about the sub-micron fiber spray, which inhibits the sub-micron fibers from being carried off by stray air currents and which promotes the entanglement of the larger and smaller diameter fibers. As a result, fewer sub-micron fibers tend to stray from the mesh-forming area into, for example, the mesh-forming machinery and facility. Preferably, the cells are arranged and controlled such that the larger diameter fibers partially intertwine in flight, forming a fibrous web, while sub-micron diameter fibers partially intertwine with the larger diameter fibers and become trapped within the web, forming a composite web having a substantial quantity of sub-micron diameter fibers.

Figure 4:
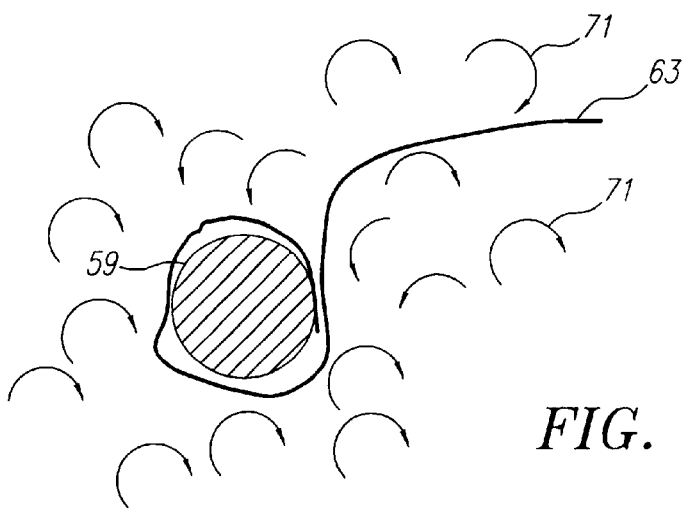
FIG. 4 is a representation of a cross section of a relatively large diameter fiber having a sub micron fiber partially wrapped therearound and surrounded by high intensity fine scale turbulence air eddies.

FIG. 4 illustrates the partial intertwining in flight of a sub-micron diameter fiber 63 around a relatively large diameter fiber 59 shown in cross section. The intertwining results in part from the fluctuating drag forces exerted on sub-micron diameter fiber 63 by the fine scale turbulence air eddies 71. They, in turn, are produced by the collision of the sprays of fibers, in a fluid dynamic manner similar to that which occurs with colliding air jets, for example, as described by J. C. Lawrence and J. M. Benninghoff in N.A.C.A.T.N. 4029 (1957).

In a further embodiment, an air permeable or porous pre-web media is placed onto and carried by the upper surface of a moving foraminous belt and sub-micron diameter fibers are deposited on a portion of the interstices of the pre-media. The interstices are of sufficient size to receive sub-micron diameter fibers. In preferred embodiments, at least some of the cells of the array are disposed at a relative distance from the belt surface such that fibers in the jet spray from those cells are provided with sufficient velocity to be driven into the interior of the interstices of the pourous material. The pre-web may be formed of any suitable support material, preferably selected for air permiability and strength. Such materials include, but are not limited to, fibrous webs made of vegetable fibers, polymeric fibers, metal fibers, ceramic fibers, or mixtures thereof In further preferred embodiments, the pre-web is electrostatically charged so as to enhance the particle attraction and retention capabilities of the resulting layered structure. In yet further embodiments, the pre-web contains a biostatic agent.

Figure 5:
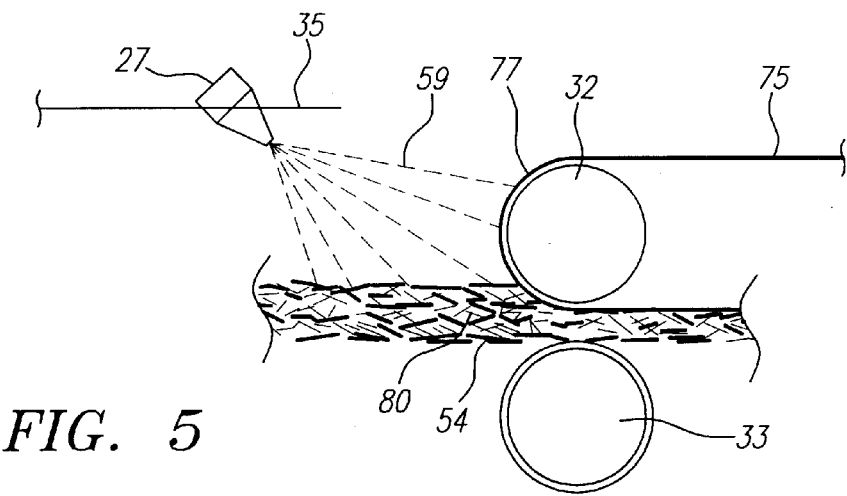
FIG. 5 is a schematic illustration showing a preferred embodiment of the invention in which a pre-filter material is incorporated onto and attached to one surface of the composite fibrous web.

In yet further preferred embodiments (such as shown in FIG. 5, the compression rolls 32, 33 shown in FIGS. 1 and 2, are set to feed a continuous sheet of pre-filter media 75, to provide a surface covering to the sub-micron diameter fiber containing composite web, with or, in other embodiments, without a pre-web layer. The compression rolls 32 and 33 are positioned close to the row of cells which is headed by cell 27. The cells of this row may be angled to project warm or hot fibers directly at the cusp 80 formed by the first contact of the pre-filter media with the fibrous web 54. In so doing, the adhesion of the pre-filter material to the fibrous web may be enhanced. In yet further preferred embodiments, pre-filter media is provided on both sides of the fibrous web resulting from the process. The bottom side of the fibrous web 54 shown in FIG. 5 may be provided with a first pre-filter media in the manner discussed in the preceding paragraph, or any other suitable manner, and the top side of the web may be provided with a second pre-filter media in a manner as shown in FIG. 5 or any other suitable manner, such that a layered structure is formed having a layer of fibrous web 54 between first and second pre-filter media layers.

Preferably, the pre-filter media is selected to have the ability to filter out relatively large particles prior to their contacting the web containing the sub-micron diameter fibers. In one preferred embodiment, a 2.5 ounce/square yard, pre-filter material produced by Union Wadding Co., Pawtucket, R.I. is used. However, other embodiments may employ other suitable pre-filter materials.

In accordance with a preferred embodiment of the apparatus shown in FIGS. 1 and 2, all fiber producing cells contained in the cell mounting plate 35 are spaced so that the points of origin of their respective sprays are separated by a distance of from about 0.25 to about 3 inches from each other, and preferably from about 0.5 to about 2 inches and more preferably from about 0.75 to about 1.5 inches. The cell mounting plate may contain from 2 to 25 rows of cells, preferably from 4 to 20 rows of cells and more preferably from 6 to 15 rows of cells in the direction of movement of belt 30. Each row may contain from 2 to 120, preferably 10 to 80, and more preferably 20 to 60 cells.

The vertical distance of the cell mounting plate 35 from the top surface of the foraminous belt 30 was found to be a factor affecting the filtration properties of the resulting fibrous web. At very short distances, the high momentum of collision and relatively high temperatures of the fibers contribute to their bonding together by fusion. As the distance is increased, the bonding tends to decrease and the loftiness of the resulting fibrous web tends to increase. Increasing loftiness generally decreases the overall resistance of the fibrous web to the passage of air, but with a corresponding decrease in filtration efficiency.

In preferred embodiments, the vertical distance could be from about 2 to about 16 inches, more preferably from about 4 to about 12 inches and yet more preferably from about 6 to about 10 inches. In further preferred embodiments, the vertical distance between selected cells in the array and the belt surface may be lower than other cells in the array, for example, to provide selected areas or patterns of less lofty, but higher bonded fibers in the web, or to provide a more uniform distribution of the more highly bonded fibers across the width of the web. For example, in one preferred embodiment, the cells in the first and second rows of the array may be arranged closer to the belt surface than the other cells in the array (for example, from about 2 inches to about 5 inches from the plane of the belt surface).

The foraminous belt 30 may be constructed from any material that has sufficient strength to maintain its integrity when subjected to the mechanical stresses due to its rotation. The belt is preferably driven by suitable drive means (not shown) at a controlled speed selected to achieve the weight per unit of cross sectional area desired in the resulting fibrous web of fibers. For many applications, a woven stainless steel screen mesh provides a suitable belt material. Alternatively, foraminous belts made from temperature resistant polymers including, but not limited to, Teflon, or inorganic materials including, but not limited to, fiberglass.

The air suction box 19 is disposed on the opposite surface of the belt which receives the fibers produced by the cells, as the fibers collide and settle. The foraminous belt 30 contains openings which allow for air passage into the air suction box 19. The openings are sufficiently small to prevent the passage of substantial amounts of fibers through the belt under the action of the suction applied. Also, they are selected to provide sufficient resistance to air flow to cause the rate of air removal to be uniform across the fibrous web. The overall resistance to air flow is selected to accommodated the available air suction fans. Accordingly, the openings can be squares of dimensions from about 0.02 to about 0.5 inch square, preferably from about 0.04 to about 0.4 inch square and more preferably from about 0.1 to about 0.3 inch square.

The fibrous web 54 collected on the foraminous belt 30 is fed to compaction rolls 32 and 33 for compaction or calendering to control the filtration characteristics of the finished fibrous web. It has been found that increasing compaction results in increased filtration efficiency coincident with an increase of resistance to air flow.

To obtain a specific end thickness, spacer shims (not shown) may be selectively placed at the edges of each compaction roll, to control the minimum distance between the compaction rolls, to obtain a controlled, fixed thickness. The distance between compaction rolls, for example, is preferably from about 0.1 to about 0.9 inch, more preferably from about 0.2 to about 0.7 inch and more preferably from about 0.3 to about 0.6 inch. In cases where a firm filtration fibrous web is desired, the compaction rolls are provided with a conventional heating means, such as infra red heating means or resistive heating means (not shown), to raise their temperature to the vicinity of the softening temperature of the fibers.

For some applications, the fibrous webs containing sub-micron fibers can be a layer or plural layers in a multi-layer structure. One or more of the layers in the structure may be electrostatically charged to enhance particle attraction and retention capabilities. Further layers may be provided as additional supporting structures including, but not limited to, metal wire meshes or permeable plastic films. Other layers could be used for purposes such as absorbency, biostatic activity, surface texture, retention means, rigidification, and can be non-woven webs formed of, for example, staple spun-bonded and/or melt-blown or flash-spun or extruded fibers. The other layers can be attached to a sub-micron fiber mesh by conventional techniques, including, but not limited to heat bonding, selective binders or adhesives or mechanical engagement, such as hydroentanglement or needle punching. Other structures could also be included in a further composite structure, such as reinforcing or elastic threads or strands.

Webs, or composite structures including webs of the invention can be further processed after collection or assembly such as by further calendaring or point embossing to increase web strength, provide a patterned surface, and fuse fibers at contact points in a web structure or the like; needle punching; heat or molding operations; coating, such as with adhesives to provide a tape structure; or the like.

Although FIGS. 1 and 2 show the cells receiving their molten polymer feed from a single conduit 51, they can be fed from a multiplicity of conduits containing different polymer compositions. In this way, families of unique composite webs of fibers may be prepared in which fibers made from differing materials are combined by intimate interlocking and intertwining, rather than in separable layers or clumped mixtures which have relatively low strength.

Although polypropylene is a preferred fiber material, fiber webs produced in accordance with embodiments of the present invention may be made from any thermoplastic polymeric material, or blend of such materials, having suitable viscosities for melt-blowing operations. Examples of appropriate polymeric materials include, but are not limited to, polyesters, such as polyethylene terephthalate; the general family of polyalkylenes; polyamides, such as nylon 6; polystyrenes; polyarylsulphones; elastomeric thermoplastics, such as polyurethanes (e.g., "Morthane™", available from Morton Thiokol Corp.); A-B block co-polymers, where A is formed of poly(vinyl arene) moities such as polystyrene, and B is an elastomeric mid-block such as a conjugated diene or a lower alkene in the form of a linear di-ortri-block copolymer, a star, radial or branched copolymer, such as elastomers sold as "KRATOM™" (Shell Chemical Co.); polyetheresters (such as "Arnitel™" available from Akzo Plastics Co.); and polyamides (such as "Pebax™" available from Autochem Co.). Copolymers and blends can also be used. Examples include A-B copolymer blends as described by Morman (U.S. Pat. No. 4,657,802).

Since each fiber producing cell may be fed by its own polymer melt supply means, specific cells can be controlled to produce fibers made from any of the polymers cited thereby allowing the production of fibrous webs with controllable composition variations. Also, the individual melts may be in the form of multi-composition melts such as are described by Joseph et. al. (U.S. Pat. No. 5,207,970).

Further preferred embodiments of the present invention are described with reference to the two examples described below.

EXAMPLE 1

A molten polypropylene polymer with a melt flow rating of 30.5 gram./sec. was fed to an apparatus as shown FIGS. 1 and 2, except that the two dimensional array of fiber producing cells consisted of 9 rows spaced at 1 inch from each other in the "x", i.e. downstream direction and each row contained 36 cells spaced one inch from each other in the "y", i.e. transverse direction. The array of cells thereby constituted a 9×36 array rather than the 9×8 array illustrated in FIG. 1.

The cells were adjusted to operate at a fiber production rate of approximately 0.4 lb./hr. Alternate cells in the array in both the x and y directions were set so that they produced fibers predominantly 1 to 2 microns in diameter. The cells of the remaining rows were set so that they produced fibers predominantly 0.1 to 0.8 microns in diameter.

The cell mounting plate was located 10 inches from the foraminous belt. The fibers produced by each cell generally collided with the cells produced by adjacent cells and settled in an intertwined state to form a fibrous composite fibrous web which collected on the foraminous belt. The belt was rotated at a speed which controlled the fibrous web weight to approximately 2 oz. per sq. yard.

The fibrous web obtained was subsequently subjected to electrostatic charging in accordance with well known charging processes including, but not limited to, that described in U.S. Pat. No. 5,401,446 to Tsai et al., incorporated herein by reference, and was subsequently found to have the air filtration characteristics shown in FIG. 8. This is compared with the filtration characteristics of typical electrically charged media available commercially as summarized in Advances in Filtration and Separation Technology, Volume 9, 1995, page 488.

Figure 7:
FIG. 7 is a scanning electron micrograph of a portion of a fibrous web produced in accordance with Example 1, after a filtering operation.
Figure 6:
FIG. 6 is a scanning electron micrograph of a portion of a fibrous web having sub-micron diameter fibers partially intertwined around larger diameter structure-forming fibers, produced in accordance with a preferred embodiment of the invention as described in Example 1.
Figure 8:
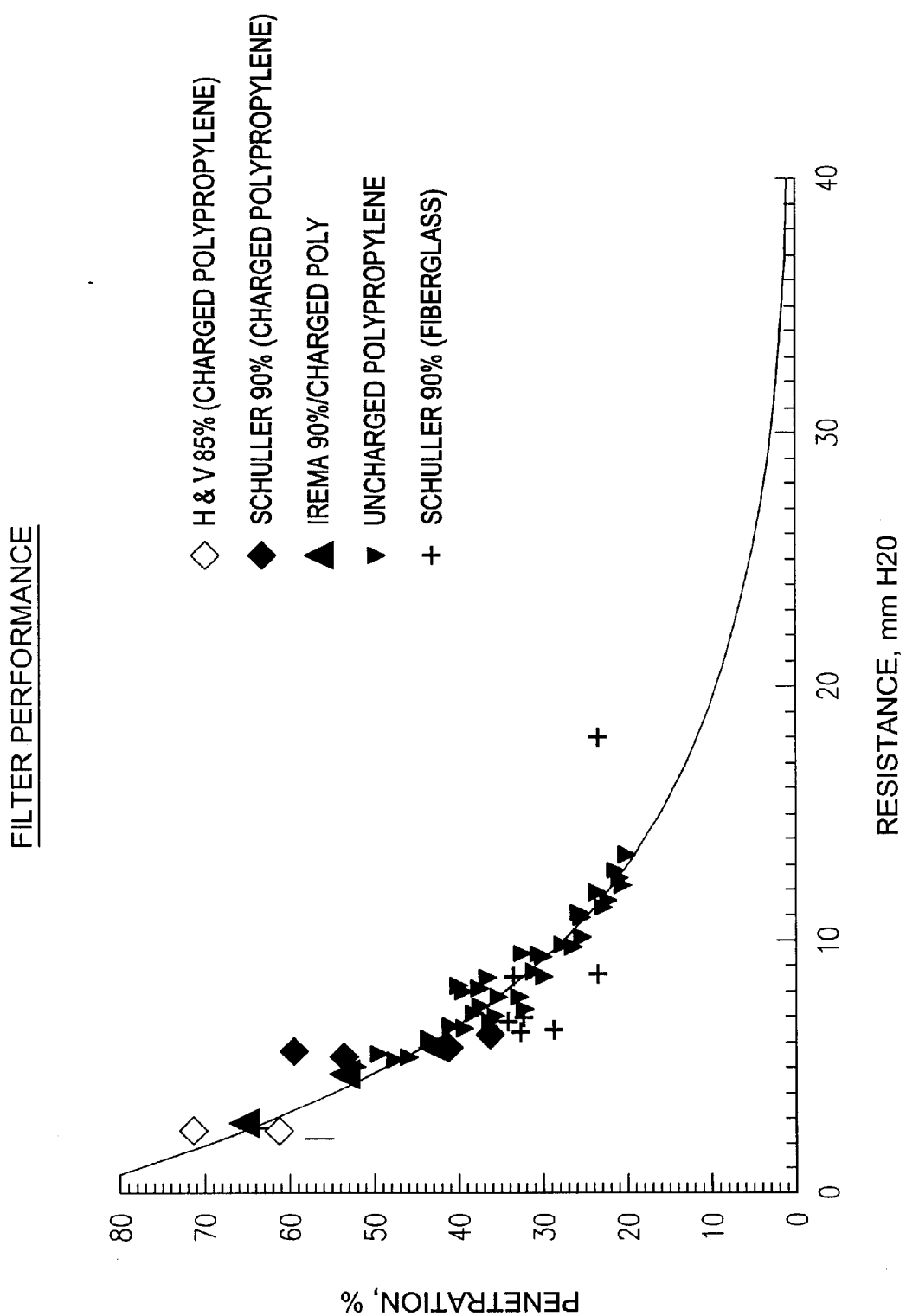
FIG. 8 is a plot illustration of filtration efficiency performance of composite fibrous webs of uncharged media for Example 1 prepared in accordance with a preferred embodiment of the invention compared with the filtration efficiency of various existing commercial filters made up of charged media.
Figure 9:
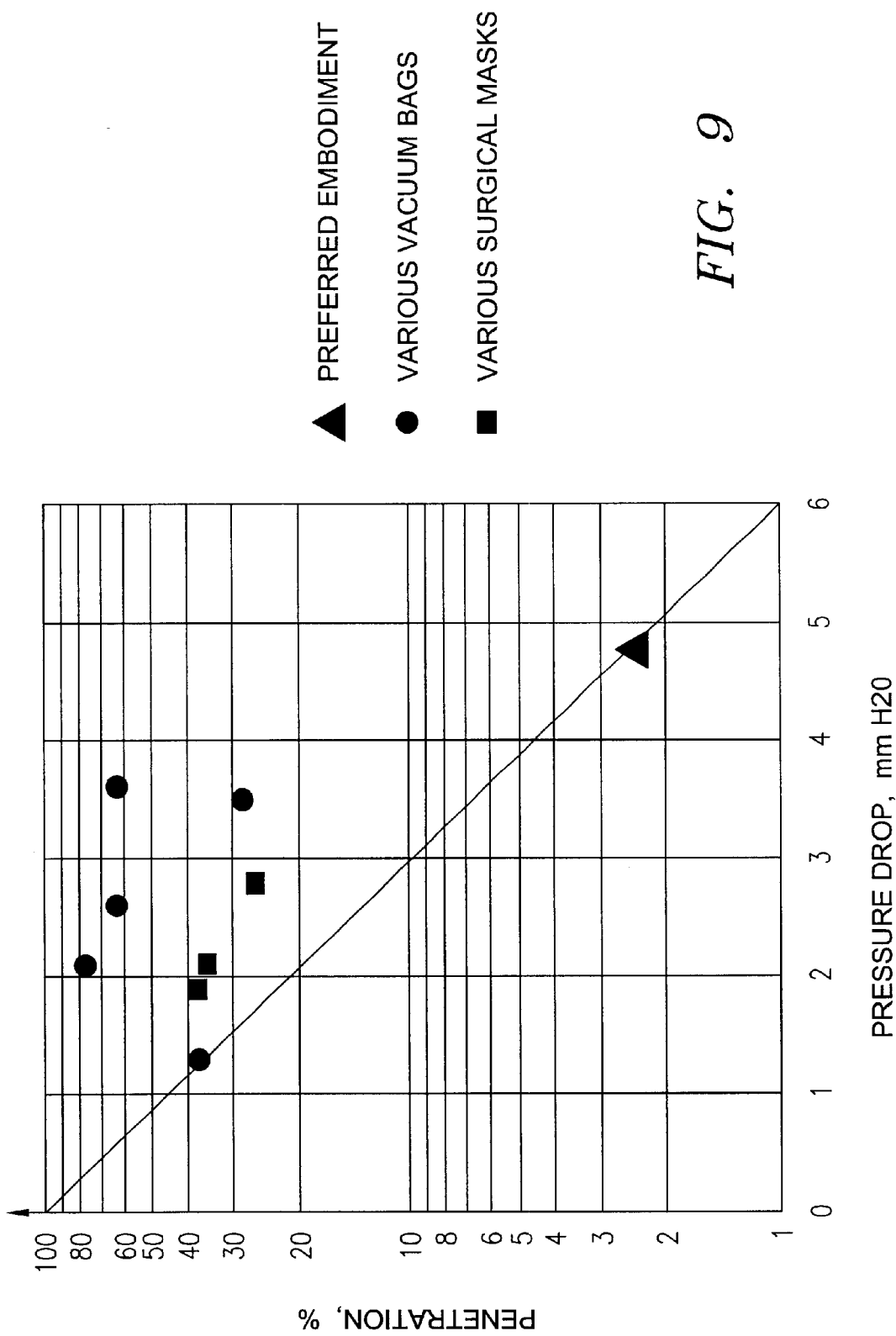
FIG. 9 is another plot illustration of filtration efficiency performance of composite fibrous webs of charged media produced in accordance with a preferred embodiment of this invention, compared with the filtration efficiency of various existing commercial filters made of charged media.

The scanning electron micrograph (SEM) of FIG. 6 shows a portion of a fibrous web having sub-micron diameter fibers partially intertwined around larger diameter structure-forming fibers, produced in accordance with the embodiment of Example 1. The SEM of FIG. 6 shows a substantial quantity of sub-micron diameter fibers intertwined with fibers having diameters of one micron or greater. The SEM of FIG. 7 shows a portion of a fibrous web produced in accordance with Example 1, after a filtering operation, showing particles greater than one micron being retained by the larger diameter fibers, while sub-micron particles are retained by sub-micron fibers within the web. FIG. 8 is a plot illustration of filtration efficiency performance (in penetration percentage vs. resistance) of composite fibrous webs of uncharged media prepared in accordance with Example 1, compared with the filtration efficiency of various existing commercial filters made up of charged media. FIG. 9 is a further plot illustration of filtration efficiency performance (in penetration percentage vs. pressure drop), comparing a composite fibrous web made in accordance with a preferred embodiment of the present invention with various vacuum bags and surgical masks.

EXAMPLE 2

A molten polypropylene polymer with a melt flow rating of 800 gram./sec. was fed to an apparatus as shown FIGS. 1 and 2, except that the two dimensional array of fiber producing cells consisted of 9 rows spaced at 1 inch from each other in a downstream direction and each row contained 36 cells spaced one inch from each other in the transverse direction. The array of cells thereby constituted a 9×36 array.

The cells were adjusted to operate at a fiber production rate of approximately 0.3 lb./hr. The cells of the first, third, sixth and ninth rows were set so that they produced fibers of approximately 1 to 2 microns in diameter. The cells of the remaining rows were set so that they produced fibers of approximately 0.1 to 0.8 microns in diameter.

The cell mounting plate was located 9 inches from the foraminous belt. The fibers produced by each cell generally collided with the cells produced by adjacent cells and settled in an intertwined state to form a fibrous composite fibrous web which collected on the foraminous belt. The belt was rotated at a speed which controlled the fibrous web weight to approximately 3.5 oz per sq. yard.

In accordance with FIG. 5, a pre-filter material sheet was introduced continuously to the top surface of the moving fibrous web by insertion over the rotating compression rolls. The compression rolls were placed 3 inches from the last row of fiber producing cells, so that hot fibers were deposited on the pre-filter material before it was contacted with the fibrous web.

The presently disclosed embodiments are to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A composite fibrous web made in accordance with the method of:

providing a two dimensional array of individually controlled fiber producing cells, said array having closely spaced, generally parallel rows of cells, said cells in the array defining a first plurality of cells and a remainder plurality of cells;

producing a single jet spray of fluid containing entrained fibers from each cell in the array;

controlling said first plurality of the cells in the array to produce discontinuous fibers containing a relatively high percentage of sub-micron diameter fibers;

controlling the remainder plurality of cells in the array to produce sprays of fibers containing a relatively high percentage of fibers which have diameters greater than one micron;

positioning the cells in the array so as to cause the fibers in neighboring sprays to collide in flight in a fiber formation region and to promote a fine scale entanglement of the sub-microne diameter fibers with the fibers which are larger than 1 micron in diameter; and collecting the collided fibrous web on a collection surface.

2. A composite fibrous web article, comprising:

a first plurality of fibers having fiber diameters of one micron or larger, said first plurality of fibers being intertwined in a web;

a second plurality of fibers having fiber diameters of less than one micron, fibers of said second plurality being at least partially wound around fibers of said first plurality, such that said second plurality of fibers are supported in the web by said first plurality of fibers.

3. A layered filter medium, comprising:

a first layer composed of air permeable material;

a second layer composed of a composite fibrous web having a first plurality of fibers with fiber diameters of one micron or larger, said first plurality of fibers being intertwined to form a web, and a second plurality of fibers having fiber diameters of less than one micron, fibers of said second plurality being at least partially wound around fibers of said first plurality, such that said second plurality of fibers are supported in the web by said first plurality of fibers.

4. A layered filter medium as recited in claim 3, further comprising, a third layer composed of air permeable material, wherein said second layer is between said first and third layers.

5. An article as recited in claim 2, wherein the first fibers have a substantially shorter length than the second fibers.

6. An article as recited in claim 2, further comprising a sheet of porous material to which said first and second pluralities of fibers are bonded.

7. An article as recited in claim 6, wherein the sheet of porous material is composed of at least of the group consisting of vegetable fiber, polymeric fiber, metal fiber, and ceramic fiber.

8. An article as recited in claim 6, wherein the sheet of porous material contains a biostatic agent.

9. An article as recited in claim 2, further comprising a sheet of porous material to which said first and second pluralities of fibers are disposed, the porous material having interstices of sufficient size to receive sub-micron fibers, wherein at least some of the sub-micron fibers are disposed within the interstices of the porous material.

10. A filter medium as recited in claim 3, wherein the first fibers have a substantially shorter length than the second fibers.

11. An article as recited in claim 3, wherein the sheet of air permeable material is composed of at least of the group consisting of vegetable fiber, polymeric fiber, metal fiber, and ceramic fiber.

12. An article as recited in claim 6, wherein the sheet of air permeable material contains a biostatic agent.

13. An article as recited in claim 2, wherein the air permeable material has interstices of sufficient size to receive sub-micron fibers, wherein at least some of the sub-micron fibers are disposed within the interstices of the porous material.

14. An article as recited in claim 2, wherein said first and second plurality of fibers include fibers made of mutually polymeric compositions.

15. An article recited as in claim 2, wherein the first plurality of fibers and the second plurality of fibers intertwine in flight.

16. An article as recited in claim 2, wherein the fibers of the first plurality of fibers and the second plurality of fibers are nascent fibers.

* * * * *